R. MAYNE-READE AND P. J. QUINN.
FENDER.
APPLICATION FILED APR. 6, 1922.
1,437,945.
Patented Dec. 5, 1922.
5 SHEETS—SHEET 1.
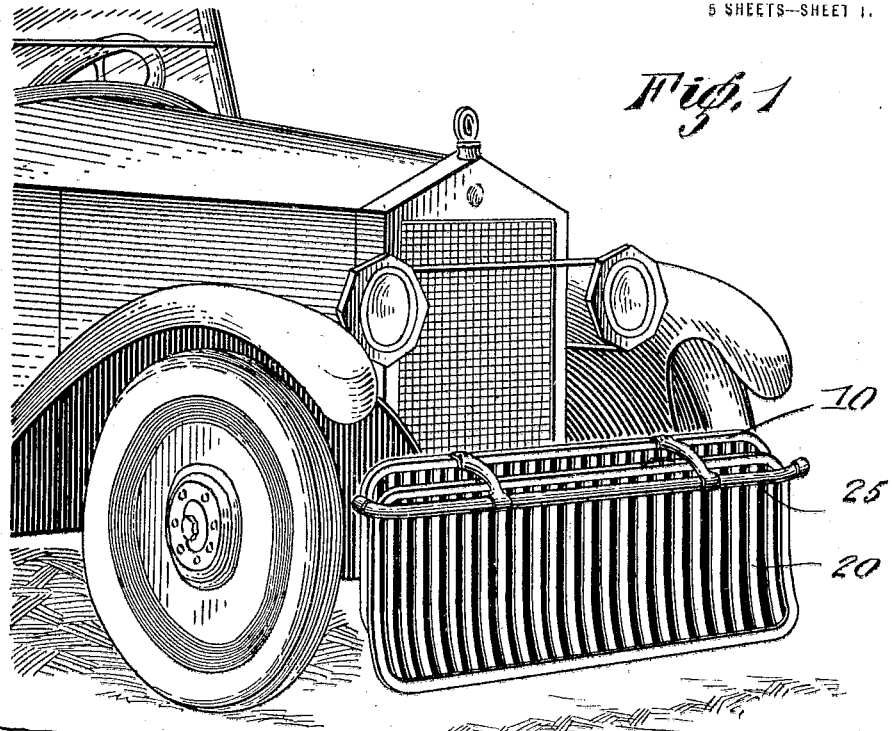
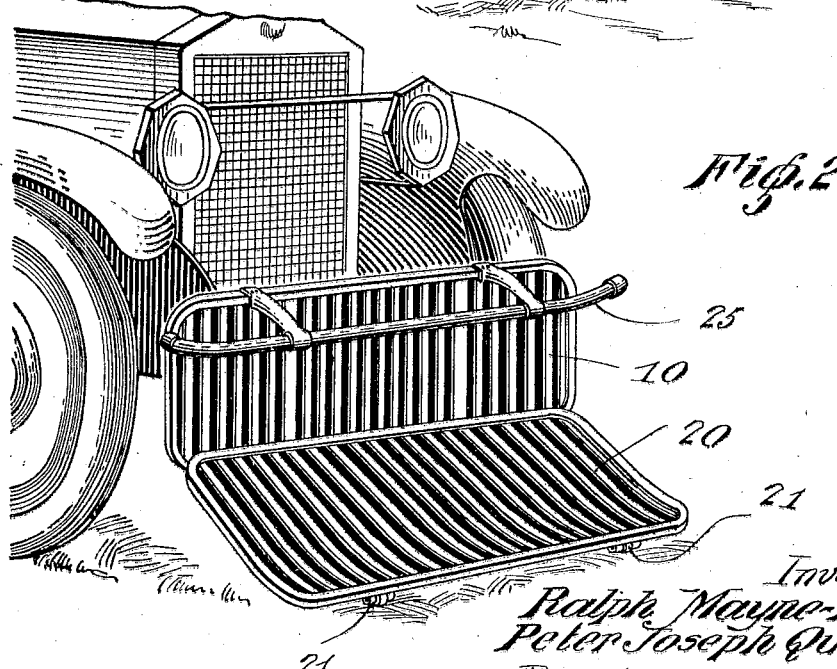

R. MAYNE-READE AND P. J. QUINN.
FENDER.
APPLICATION FILED APR. 6, 1922.

1,437,945.

Patented Dec. 5, 1922.
5 SHEETS—SHEET 2.

Inventors
Ralph Mayne-Reade
Peter Joseph Quinn
By William C Linton
Attorney

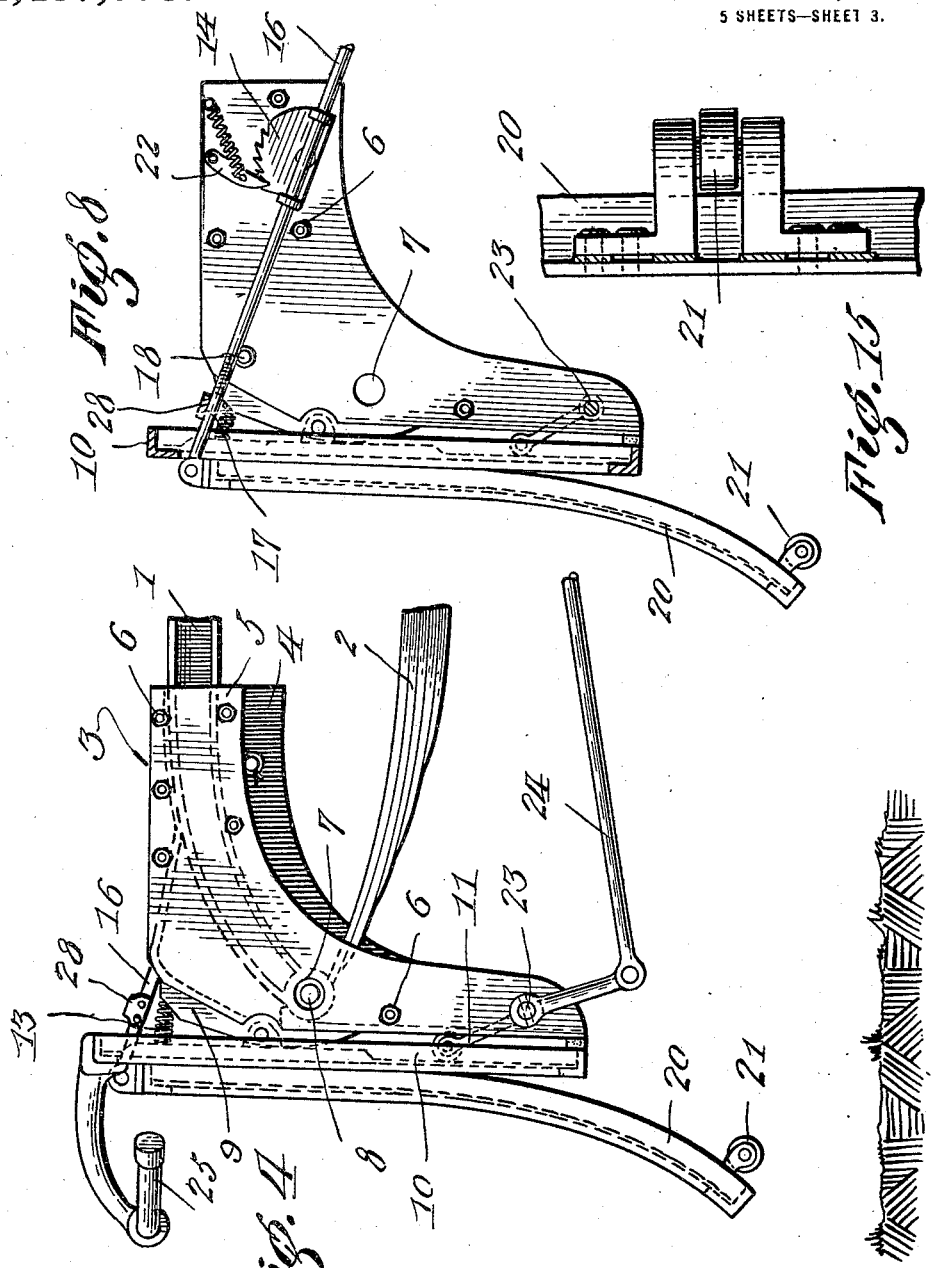

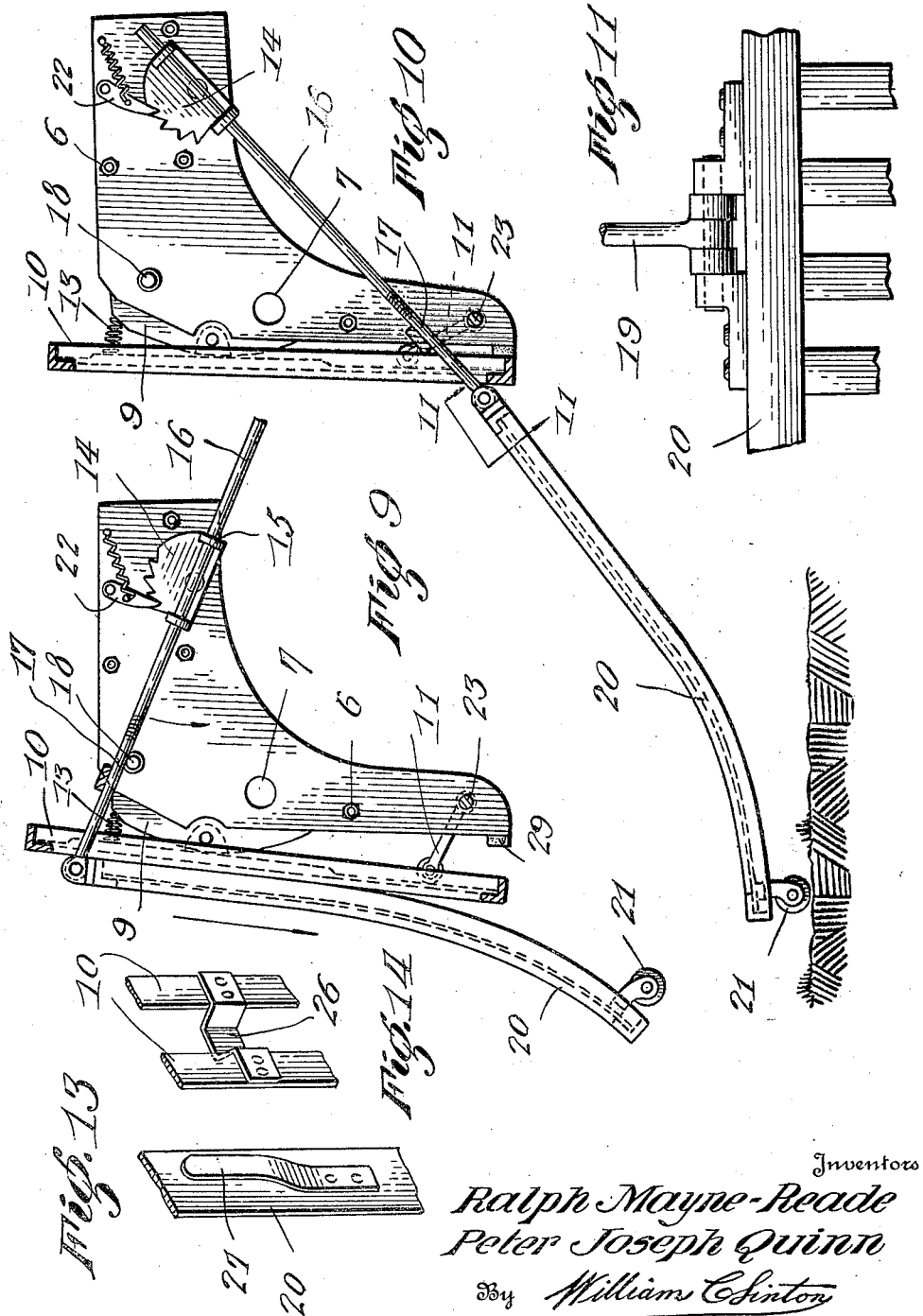

Patented Dec. 5, 1922.

1,437,945

UNITED STATES PATENT OFFICE.

RALPH MAYNE-READE AND PETER JOSEPH QUINN, OF QUEBEC, QUEBEC, CANADA.

FENDER.

Application filed April 6, 1922. Serial No. 550,180.

*To all whom it may concern:*

Be it known that we, RALPH MAYNE-READE and PETER JOSEPH QUINN, both subjects of the King of Great Britain, residing at Quebec, Province of Quebec, Canada, have invented certain new and useful Improvements in Fenders; and we do hereby declare that the following is a full, clear, and exact description of the invention, such as will enable others skilled in the art to which it appertains to make and use the same.

This invention relates to a new and useful fender, particularly of the type adapted to be employed in conjunction with an automobile or similar vehicle.

The primary object of the invention is the provision of a device of the character indicated above that can be automatically actuated either from the driver's seat or by a blow on the fender.

Another object is to provide a fender which, when brought into operative position, cannot be returned to inoperative position without the vehicle being stopped, thus preventing the escape of the vehicle after an accident has occurred.

Further objects and advantages of the invention will appear as the description develops.

A preferred embodiment is shown in the accompanying drawings in which:

Figure 1 shows the device in inoperative position;

Figure 2 is a similar view showing the fender in operative position;

Figure 4 is a side elevation, substantially from the line 4—4 of Figure 6;

Figure 8 is a section on the line 8—8 of Figure 6;

Figure 9 is a section on the line 9—9 of Figure 7;

Figure 10 is a view corresponding to Figure 9, showing the fender in operative position;

Figure 11 is a fragmentary view from the line 11—11 of Figure 10;

Figures 13 and 14 are details of the clamp members on the guide and fender; and, Figure 15 is a detail of one of the rollers attached to the fender.

Figure 3:
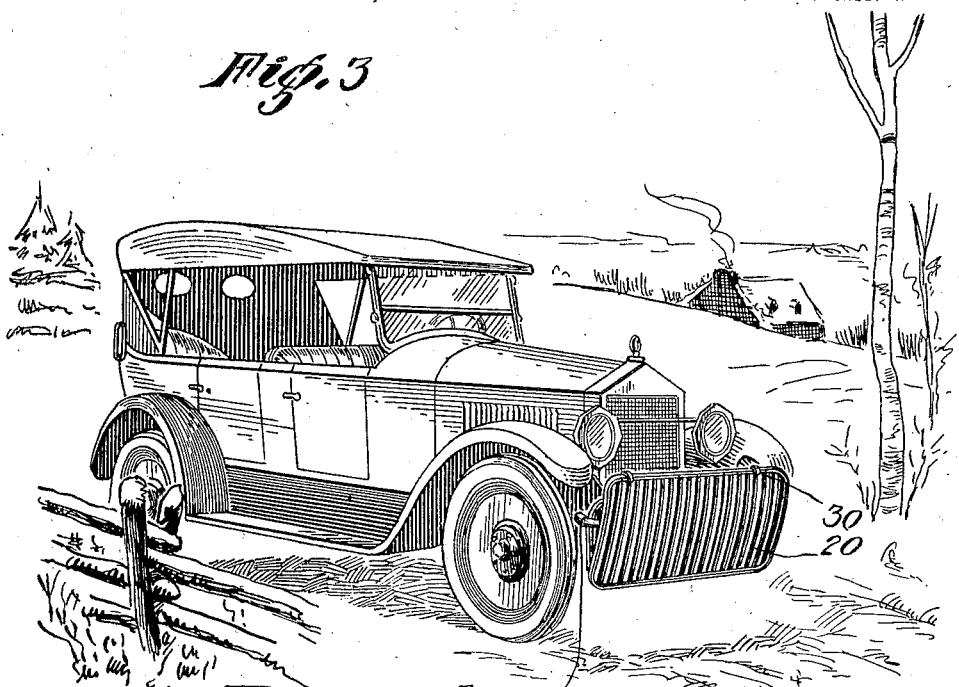
Figure 3 is a perspective view showing the fender locked in inoperative position.
Figure 5:
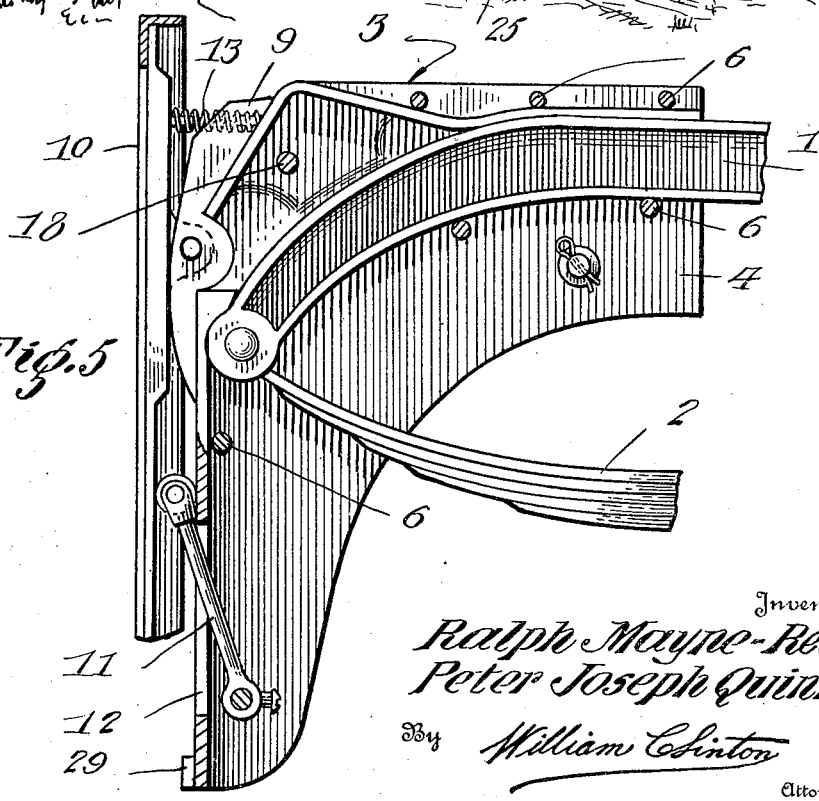
Figure 5 is a similar view, showing the interior construction of the bracket.

Referring to the accompanying drawings by reference characters, the numeral 1 indicates the goose neck of a vehicle frame to the forward end of which is attached a spring 2 in the usual manner. A bracket 3 which consists of a casing 4 and a cover plate 5 is secured to the goose neck by a number of bolts 6, the casing and cover being perforated as at 7 for the reception of the shackle bolt 8. The bracket has a forward projection 9 to which is pivotally mounted a back or guide member 10 for the fender, later to be described. A link 11 is pivoted to the bracket and guide and works in a slot 12 formed in the bracket. The upper portions of the bracket and frame have secured thereto a compression spring 13, the purpose of which is to maintain the guide and members associated therewith under pressure towards the front of the vehicle. It will be understood that the arrangement already described is attached to each goose neck portion of the vehicle frame.

Each bracket has pivoted thereto on its inner face a ratchet member 14 having formed thereon bearings 15 in which is slidably supported a rod 16. The rear or inner portion of the rod is offset as at 17, which offset portion is adapted to rest on a pin 18 secured to the bracket. The other portion of the rod extends beyond the end of the pin, as clearly shown in Figure 6. These rods pass through the guide member and are locked therein by the curved portion 19. The outer ends protrude through the guide, and a curved fender 20 is pivotally supported thereon. The lower end of the fender carries rollers 21 in the usual manner. A spring actuated pawl 22 is pivoted to the bracket for cooperation with the ratchet.

Figure 6:
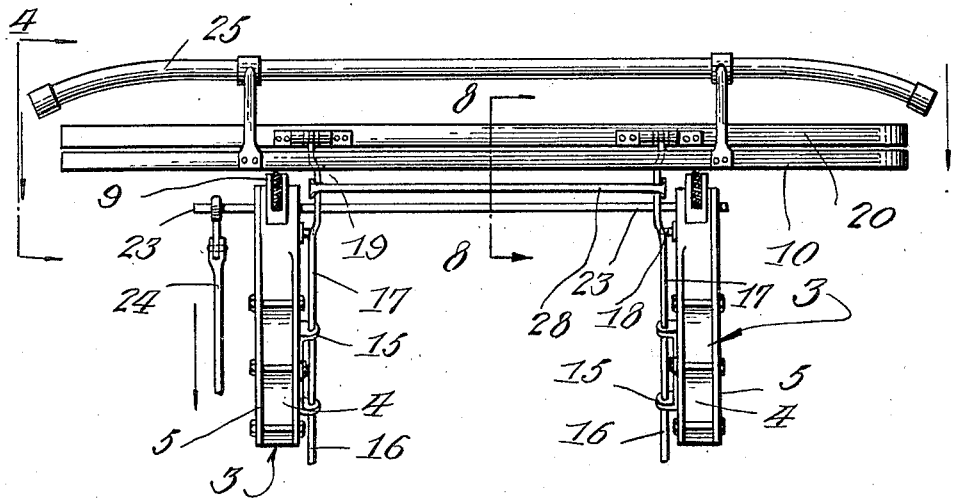
Figure 6 is a plan of the device in inoperative position.
Figure 7:
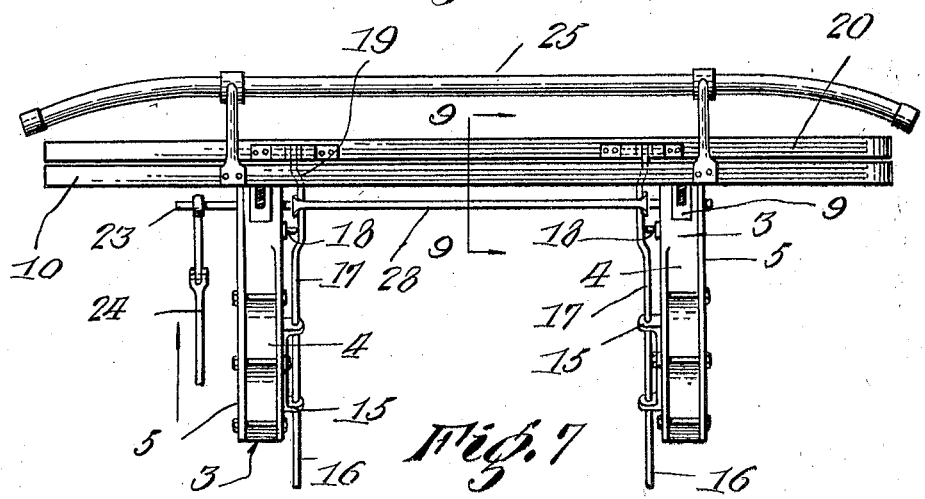
Figure 7 is a similar view showing the fender released and about to drop.
Figure 12:
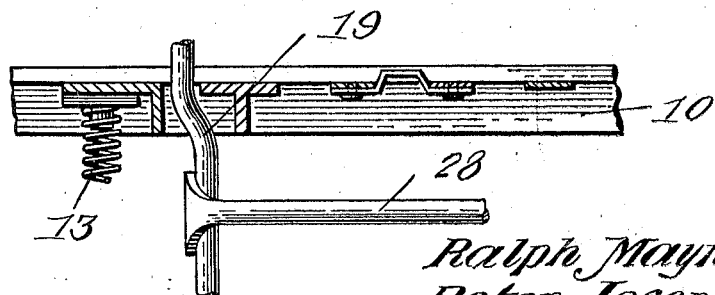
Figure 12 is a fragmentary detail view taken on Figure 7.

The ends of the links 11 which are mounted on the bracket are joined by a rod 23, one end of which carries a bell crank lever 24 that is operable frome the driver's seat. It will be apparent that when the fender is in raised position, the offset portions 17 resting on the pins 18, a pull on the lever 24 will urge the guide member outwardly away from the bracket. Since the rod 16 is locked in the guide member, it will likewise move outwardly, causing the offset portion to disengage the pin and allowing the fender to drop to the ground, as shown in Figures 6 and 10. The downward movement of the rod 16 causes the rotation of the ratchet 14 and the locking of the parts in lowered position by means of the pawl 22. In order that the fender can be raised it will be necessary for the driver to bring the vehicle to a stop and to release the pawl from the ratchet.

In order that the fender may again be raised, it will be necessary for the driver to bring the vehicle to a stop and to release the pawl from the ratchet.

In order that the fender may be brought into downward position immediately upon the occurrence of an accident, a bumper 25 of ordinary construction is secured to the guide member 10. A blow on the bumper, in the direction of the arrows shown in Figure 6, causes a tilting movement of the guide about its pivot point, whereupon the offset portion 17 of the rod 16 is disengaged from the pin 18 exactly as if the link 11 were actuated in the manner above described. The contacting faces of the guide and fender carry respectively sockets 26 and spring clips 27, the object of which is to prevent rattling of the guide and fender when the latter is raised.

A brace 28 is provided for joining the rods 16 in order to prevent undesired twisting or turning thereof. The lower ends of the bracket carry cushions or rubber pads 29 in order to prevent jarring between the brackets and the guide. As a further auxiliary for the device, a plurality of yokes 30 may be secured to some stationary part of the vehicle, in order that the fender may be locked in inoperative position. It is to be noted in this connection that the rods 16 are of sufficient length to allow the fender to be positioned on the forward side of the bumper and slightly upwardly thereof, as clearly shown in Figure 3.

While a particular embodiment of the invention has been illustrated and described, it is to be understood that various details of construction may be altered or modified within the scope of the appended claims.

Having thus fully described the invention, what we claim as new and desire to protect by Letters Patent is:—

1. In combination with a vehicle, a bracket secured thereto, a guide member attached to the bracket, a bearing member pivotally connected to a side of the bracket, a fender slidable along the guide, and a rod slidably mounted in said bearing and connected to said fender.

2. A device of the class described comprising a bracket adapted for attachment to the frame of a vehicle, a guide member attached to the bracket, a bearing member pivotally connected to a side of the bracket, a fender slidable along the guide, and a rod slidably mounted in said bearing and connected to said fender.

3. In combination with a vehicle, a substantially vertical guide member, and a fender the lower end of which is adapted to move in an arcuate path away from the guide, and means for causing the other end of the fender to move in a plane parallel to that of the guide.

4. A device of the class described comprising a pair of brackets adapted for attachment to the frame of a vehicle, a guide member supported at the edges of said brackets, a fender slidable along said guide, a slidable rod pivotally mounted on each of said brackets, said rod being pivotally connected to the upper portion of said fender.

5. A device of the class described comprising a bracket adapted to be secured to the frame of a vehicle, a guide member attached to the bracket, a bearing member pivotally mounted on a side of said bracket, a rod slidably supported by said bearing member and extending through the guide member, and a fender suspended from said rod.

6. In combination with a vehicle, a bracket secured thereto, a guide member attached to the bracket, a fender slidable along the guide, a slidable rod pivotally mounted on the bracket and fender and having an offset portion, a pin secured to the upper part of the bracket and adapted to support the offset portion to hold the fender in raised position, and means for releasing the offset portion from the pin.

7. In combination with a vehicle, a bracket secured thereto, a movable guide member attached to the bracket, a fender slidable along the guide, a slidable rod pivotally mounted on the bracket and fender and having an offset portion, a pin secured to the upper part of the bracket and adapted to support the offset portion to hold the fender in raised position, a link pivoted to the guide and fender, and means for actuating said link.

8. In combination with a vehicle, a bracket secured thereto, a guide member attached to the bracket, a fender slidable along the guide, a slidable rod pivotally mounted on the bracket and fender and having an offset portion, a pin secured to the upper part of the bracket and adapted to support the offset portion to hold the fender in raised position, means for releasing the offset portion from the pin, and a pawl and ratchet associated with the rod to hold the same in lowered position.

9. In combination with a vehicle, a bracket secured thereto, a movable guide member attached to the bracket, a fender slidable along the guide, a slidable rod pivotally mounted on the bracket and fender and having an offset portion, said rod being locked in the guide, a pin secured to the upper part of the bracket and adapted to support the offset portion to hold the fender in raised position, and a bumper attached to the guide.

10. In combination with a vehicle, a bracket secured thereto, a movable guide member attached to the bracket, a fender slidable along the guide, a slidable rod pivotally mounted on the bracket and fender and having an offset portion, a pin secured to the upper part of the bracket and adapted to support the offset portion to hold the fender in raised position, a link pivoted to the guide and bracket, means for actuating said link, and a bumper attached to the guide.

11. In combination with a vehicle, a bracket secured thereto, a movable guide member atached to the bracket, a fender slidable along the guide, a slidable rod pivotally mounted on the bracket and fender and having an offset portion, a pin secured to the upper part of the bracket and adapted to support the offset portion to hold the fender in raised position, a pawl and ratchet associated with the rod to hold the same in lowered position, a link pivoted to the guide and bracket, means for actuating said link, and a bumper attached to the guide.

12. In combination with a vehicle, a bracket secured thereto, a movable guide member attached to the bracket, a compression spring joining the bracket and guide, a fender slidable along the guide, a slidable rod pivotally mounted on the bracket and fender and having an offset portion, a pin secured to the upper part of the bracket and adapted to support the offset portion to hold the fender in raised position, and means for releasing the offset portion from the pin.

13. In combination with a vehicle, a bracket secured thereto, a guide member attached to the bracket, a fender slidable along the guide, a slidable rod pivotally mounted on the bracket and fender and having an offset portion, a pin secured to the upper part of the bracket and adapted to support the offset portion to hold the latter in raised position, clamp members on the guide and fender for retaining the latter in raised position, and means for releasing the offset portion from the pin.

14. In combination with the frame of a vehicle, a bracket secured thereto, a guide member attached to the bracket, a compression spring joining the bracket and guide, a fender slidable along the guide, a slidable rod pivotally mounted on the bracket and fender and having an offset portion, a pin secured to the upper part of the bracket and adapted to support the offset part of said portion to hold the fender in raised position, clamp members on the guide and fender for retaining the latter in raised position, and means for releasing the offset portion from the pin.

15. In combination with the frame of a vehicle, a bracket secured thereto, a guide member attached to the bracket, a fender slidable along the guide, a pawl and ratchet device pivoted to the bracket, a slidable rod mounted on the ratchet and pivoted to the fender, said rod having an offset portion, a pin secured to the upper part of the bracket and adapted to support the offset portion to hold the fender in raised position, and means for releasing the offset portion from the fender.

In witness whereof we have hereunto set our hands.

RALPH MAYNE-READE.
PETER JOSEPH QUINN.